(12) United States Patent
Nomura et al.

(10) Patent No.: US 7,732,957 B2
(45) Date of Patent: Jun. 8, 2010

(54) BRUSHLESS MOTOR

(75) Inventors: Masashi Nomura, Kyoto (JP);
Tomoyuki Tanisugi, Kyoto (JP);
Masamichi Nagata, Kyoto (JP)

(73) Assignee: Nidec Corporation, Kyoto (JP)

( * ) Notice: Subject to any disclaimer, the term of this patent is extended or adjusted under 35 U.S.C. 154(b) by 111 days.

(21) Appl. No.: 12/212,813

(22) Filed: Sep. 18, 2008

(65) Prior Publication Data

US 2009/0072638 A1    Mar. 19, 2009

(30) Foreign Application Priority Data

Sep. 19, 2007  (JP) ............................. 2007-241796
May 30, 2008  (JP) ............................. 2008-142457

(51) Int. Cl.
*H02K 11/00*    (2006.01)
(52) U.S. Cl. ................. 310/67 R; 310/68 D; 360/98.07; 360/99.01; 360/99.04; 360/99.08
(58) Field of Classification Search ............... 310/67 R, 310/68 D, 91; 360/98.07, 99.01, 99.04, 99.08
See application file for complete search history.

(56) References Cited

U.S. PATENT DOCUMENTS

| | | | | |
|---|---|---|---|---|
| 4,682,065 A | * | 7/1987 | English et al. | 310/90 |
| 5,910,694 A | * | 6/1999 | Yokozawa et al. | 310/89 |
| 7,420,310 B2 | * | 9/2008 | Kadowaki et al. | 310/216.016 |

* cited by examiner

*Primary Examiner*—Quyen Leung
*Assistant Examiner*—Leda Pham
(74) *Attorney, Agent, or Firm*—Keating & Bennett, LLP

(57) ABSTRACT

A brushless motor includes a motor drive unit, a circuit board arranged to drive the motor drive unit having through holes formed in the upper surface and the lower surface; and a motor attachment plate including a plate-shaped base portion and plate-shaped fixing portions to fix the circuit board in place. Herein, each fixing portion includes a support portion for making contact with a surface of the circuit board; an arm portion bent in a direction that is substantially parallel to the rotational axis; and a protrusion portion inserted into a through hole, having at least one overhang extension protruding from the through hole. The overhang extension of the protrusion is bent in a direction that is substantially perpendicular to the rotational axis.

12 Claims, 20 Drawing Sheets

BRUSHLESS MOTOR

BACKGROUND OF THE INVENTION

1. Field of the Invention

The present invention relates to a brushless motor in which a circuit board is fixed to an attachment plate for use in attaching the brushless motor to a motor-carrying device.

2. Description of the Related Art

A brushless motor generates a rotational driving force as an electric current that is supplied to a specified one of a plurality of coils depending on the position of magnetic poles of a rotor magnet. The respective coils are supplied with the electric current through a coil wiring and the like formed on a circuit board.

In addition to the coil wiring, a Hall element for detecting the position of magnetic poles of the rotor magnet and a pattern of a frequency generator coil for detecting the rotational speed of a rotor are formed on the circuit board. The Hall element outputs a hall signal depending on the change in a magnetic flux density of the rotor magnet caused by rotational movement of the rotor. The frequency generator coil outputs a frequency generation signal depending on the change in a magnetic flux density of a frequency generation magnet caused by rotational movement of the rotor. The brushless motor makes use of a control unit that controls the amount of electric current supplied to the respective coils using the hall signal and the frequency generation signal.

Accordingly, if the magnetic flux density of the rotor magnet or the frequency generation magnet is changed due to vibration of the circuit board or other causes, it is impossible to accurately acquire the hall signal and the frequency generation signal. In an effort to prevent vibration of the circuit board, the circuit board is fixed to an attachment plate or the like which is to be attached to a housing or other devices. For example, Japanese Patent Application Publication No. 2006-158013A discloses a brushless motor in which a circuit board is fixed to a housing thereof.

In the brushless motor set forth in Japanese Patent Application Publication No. 2006-158013A, the circuit board having a coil wiring is fixed to the housing. More specifically, the hosing is provided with a support surface for supporting the circuit board and a plurality of protrusions. In a state that the lower surface of the circuit board is supported on the support surface, the protrusions are deformed to restrain the upper surface of the circuit board. By restraining the opposite surfaces of the circuit board in this manner, the circuit board is fixed to the housing against movement.

With the brushless motor disclosed in Japanese Patent Application Publication No. 2006-158013A, however, the fixing position of the circuit board is confined to the vicinity of a rotational axis of the motor, which means that the peripheral edge region of the circuit board is not in a firmly fixed state. For that reason, the region of the circuit board distant from the rotational axis is susceptible to vibration. As already mentioned above, it is impossible to accurately acquire a hall signal and a frequency generation signal if the circuit board undergoes vibration.

Aside from the brushless motor described in Japanese Patent Application Publication No. 2006-158013A, it would be thinkable that a circuit board is fixed to an attachment plate by means of screws. More specifically, it would be possible to suppress vibration of the circuit board as a whole by screw-fixing the circuit board to the attachment plate in plural points on the peripheral edge region of the circuit board. In case of screw-fixing the circuit board to the attachment plate, however, a problem occurs in that the number of parts and the number of production steps are increased.

SUMMARY OF THE INVENTION

In view of the above, preferred embodiments of the present invention provide a brushless motor capable of suppressing vibration of a circuit board and also capable of reducing the number of parts and the number of manufacturing steps.

According to a preferred embodiment of the preferred embodiment of the present invention, a brushless motor includes a motor drive unit including a rotor rotatable about a rotational axis; a circuit board including a driving circuit arranged to drive the motor drive unit, the circuit board having an upper surface, a lower surface and a plurality of through holes formed in the upper surface and the lower surface; and a motor attachment plate including a plate-shaped base portion and plate-shaped fixing portions integral with the base portion, the base portion being arranged substantially parallel to the circuit board, the fixing portions being provided in a corresponding relationship with the through holes to fix the circuit board in place.

Each of the fixing portions preferably includes a support portion arranged to make contact with a surface of the circuit board that faces the motor attachment plate to support the circuit board; an arm portion, extended from the support portion, bent in a direction parallel or substantially parallel to the rotational axis; and a protrusion portion, extended from the arm portion, inserted into the corresponding one of the through holes from the surface of the circuit board that faces the motor attachment plate, the protrusion portion having at least one overhang extension protruding from the corresponding one of the through holes. Further, the overhang extension of the protrusion is bent in a direction perpendicular or substantially perpendicular to the rotational axis.

It is preferable that the protrusion portion includes a first protrusion that is bent in a specified direction perpendicular or substantially perpendicular to the rotational axis, and a second protrusion that is bent in a direction opposite to the specified direction.

Further, it is preferable that the specified direction is perpendicular or substantially perpendicular to a plate surface of the arm portion.

Further, it is also preferable that the specified direction is parallel or substantially parallel to a plate surface of the arm portion.

Further, it is preferable that, before being bent, the first protrusion and the second protrusion are formed to be coplanar with a plate surface of the arm portion.

Further, it is preferable that, before being bent, the first protrusion and the second protrusion are formed to be substantially parallel to an extension direction of the corresponding one of the through holes.

Further, it is preferable that the protrusion has a hook shape.

Further, it is preferable that each of the through holes is formed radially outwardly of the rotor.

Further, it is preferable that the circuit board has a coil pattern arranged to detect a rotational speed of the rotor, and each of the through holes is formed radially outwardly of the coil pattern.

Further, it is preferable that the motor attachment plate has apertures respectively formed to penetrate the motor attachment plate in boundary regions between the fixing portions and the base portion, wherein an inner circumferential surface of each of the apertures includes a first surface exposed toward a space opposite to a space where the circuit board is mounted.

Further, it is preferable that the first surface extends substantially parallel to the circuit board.

Further, it is preferable that the protrusion portion is bent by supporting the first surface on a jig.

In the brushless motor according to a preferred embodiment of the present invention, the protrusion portion of each of the fixing portions is inserted into the corresponding one of the plurality of through holes of the circuit board in a state that the circuit board makes contact with the support portion of each of the fixing portions.

The overhang extension of the protrusion portion that protrudes above the upper surface of the circuit board is bent in a direction that is perpendicular or substantially perpendicular to the rotational axis, thereby fixing the circuit board to the motor attachment plate. This makes it possible to reduce the number of parts and the number of production steps, as compared to a case where the circuit board would be fixed to the motor attachment plate via screws.

The protrusion portion includes the first protrusion and the second protrusion that are bent in directions opposite to each other that are perpendicular or substantially perpendicular to the plate surface of the corresponding one of the fixing portions. This makes it possible to prevent generation of warp in the circuit board, which would otherwise occur when fixing the circuit board in place.

The first protrusion and the second protrusion may also be bent in directions opposite to each other that are parallel or substantially parallel to the plate surface of the corresponding one of the fixing portions. In this case as well, it is possible to prevent generation of warp and the like in the circuit board.

By forming the tip portion of the protrusion portion into a shape like a bent hook, it is possible to reduce the area on the circuit board occupied by the protrusion portion. This makes it possible to use the circuit board more efficiently.

Furthermore, since the through holes are formed radially outwardly of the coil pattern or radially outwardly of the rotor, the circuit board is fixed to the motor attachment plate at its peripheral edge region. Therefore, it is possible to suppress generation of vibration in the peripheral edge region of the circuit board.

In addition, by supporting the first surface exposed to the opposite direction from the circuit board via the jig, it is possible to bend the protrusion portion without directly applying a force to the circuit board. This makes it possible to fix the circuit board to the motor attachment plate without causing damage to the circuit board.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 1:
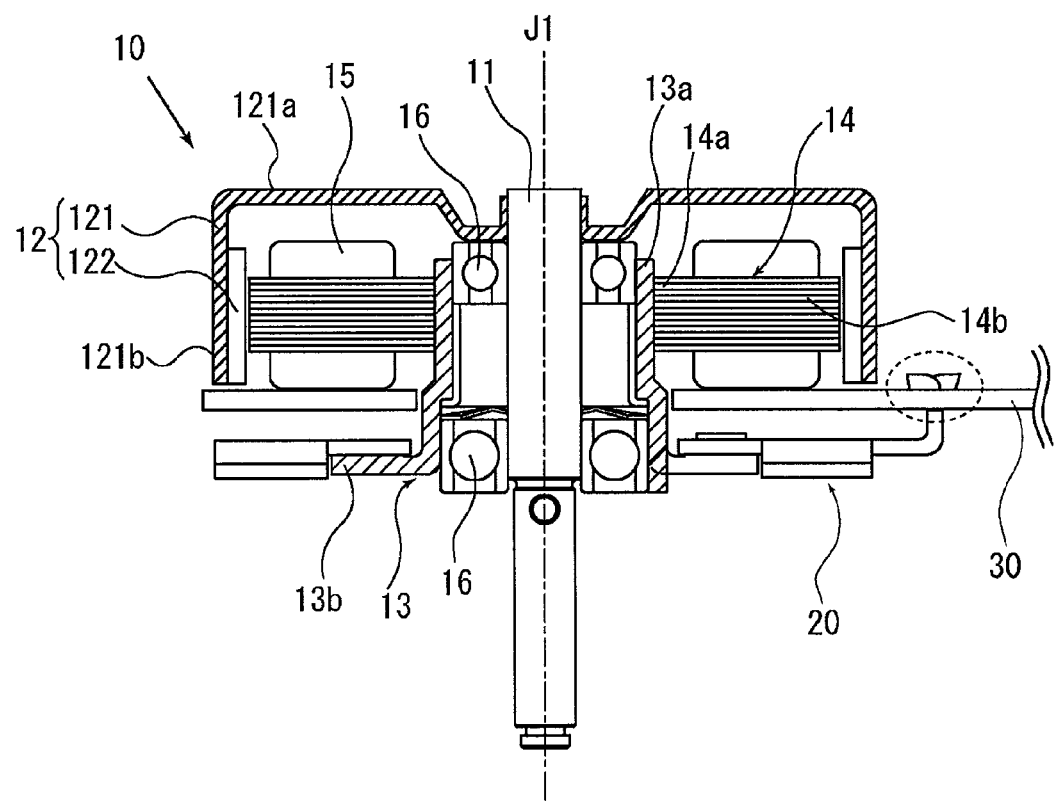
FIG. 1 is a side elevational section view showing a brushless motor in accordance with a preferred embodiment of the present invention.

A first preferred embodiment of the present invention will now be described with reference to the accompanying drawings. FIG. 1 is a side elevational section view showing a brushless motor of the present preferred embodiment. Referring to FIG. 1, a brushless motor 10 includes a shaft 11, a rotor 12, a housing 13, a stator core 14, a coil 15, an attachment plate 20 and a circuit board 30.

The brushless motor 10 is installed in different states and arranged in different directions depending on the kinds of devices carrying the same. This means that the brushless motor 10 has no upward and downward direction in the absolute meaning. Nevertheless, for the purpose of convenience, description will be made herein below by regarding the upward and downward directions in FIG. 1 as the upward and downward directions of the brushless motor 10.

The shaft 11 is coaxially arranged with the rotational axis J1. The rotor 12 is fixed to the shaft 11 and is rotated together with the shaft 11 about the rotational axis J1. The rotor 12 includes a rotor holder 121 and a rotor magnet 122.

The rotor holder 121 is preferably formed by pressing a metal plate. The rotor holder 121 has a disk-like cover portion 121a concentrically arranged with the rotational axis J1 and a cylinder portion 121b extending downwardly from the peripheral edge of the cover portion 121a. The rotor magnet 122 is fixed to the inner circumferential surface of the cylinder portion 121b.

The housing 13 is provided with a cylinder portion 13a for holding the shaft 11 in place and an annular flange portion 13b continuously extending from the lower end of the cylinder portion 13a. The shaft 11 is rotatably held in the cylinder portion 13a by a plurality of ball bearings 16 arranged inside the upper and lower extensions of the cylinder portion 13a. A plurality of protrusions are formed in the flange portion 13b. As the protrusions of the flange portion 13b are deformed under pressure, the housing 13 is fixed to the attachment plate 20.

The stator core 14 is fixed to the outer circumferential surface of the housing 13. The stator core 14 has a core-back portion 14a annularly formed about the rotational axis J1 and a plurality of tooth portions 14b radially extending from the core-back portion 14a about the rotational axis J1. The coil 15 is wound around the respective tooth portions 14b.

The attachment plate 20 is a base plate for fixing the brushless motor 10 to a motor-carrying device. On the circuit board 30, there are formed a coil wiring (not shown) for supplying an electric current to the coil 15 therethrough, a Hall element (not shown) for detecting the position of magnetic poles of the rotor magnet 122, a frequency generator coil pattern 32 (see FIG. 6), and so forth. The circuit board 30 is attached to the attachment plate 20. The attachment plate 20 and the circuit board 30 are arranged perpendicularly to the rotational axis J1.

In the brushless motor 10 as configured above, the rotor 12 rotates as an electric current is supplied under the control of a control unit (not shown) to the coil 15 depending on the position of magnetic poles of the rotor magnet 122. Thus, the brushless motor 10 produces a rotational driving force.

Configuration of Attachment Plate

Figure 2:
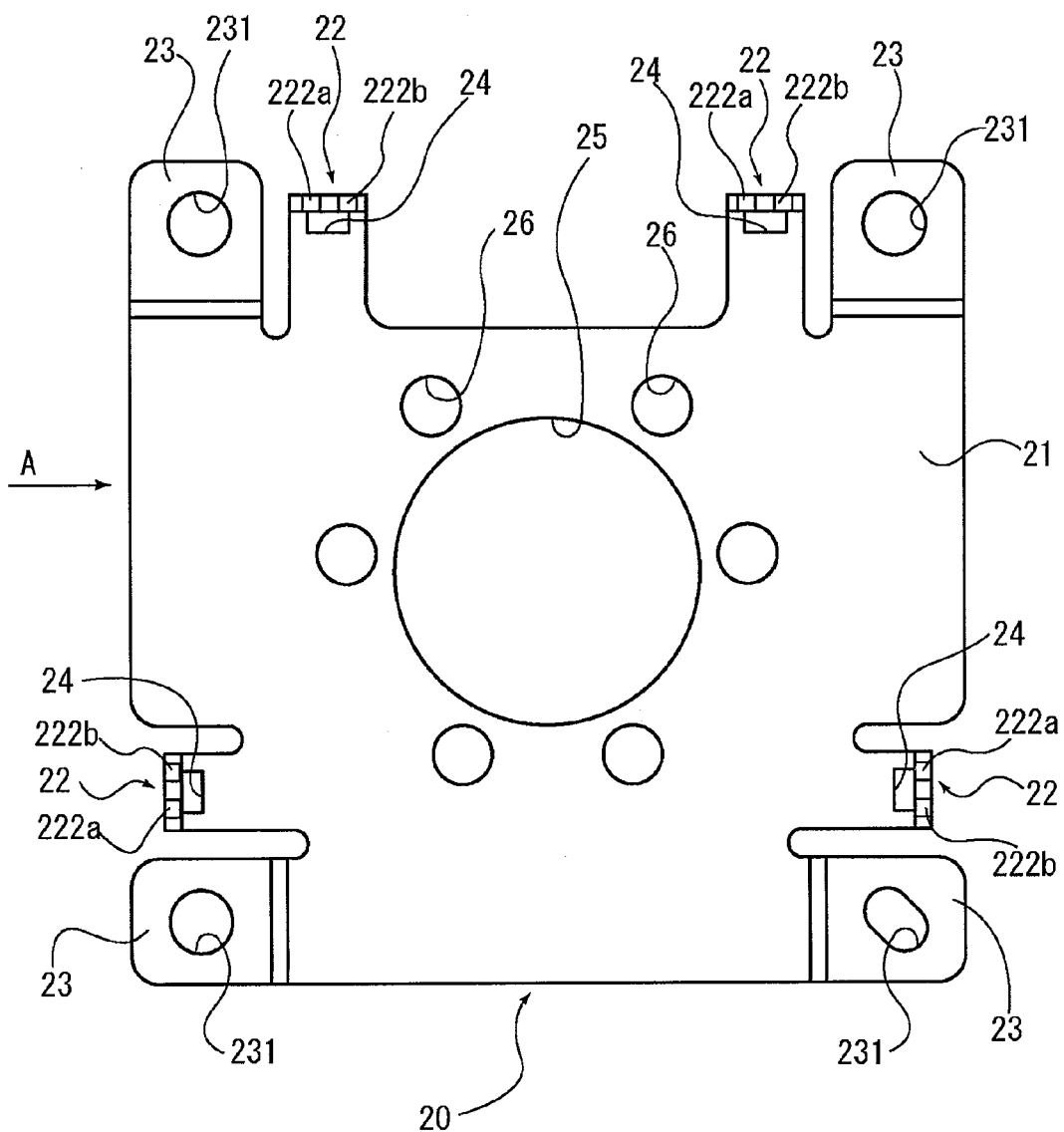
FIG. 2 is a top plan view of an attachment plate in accordance with a preferred embodiment of the present invention.
Figure 3:
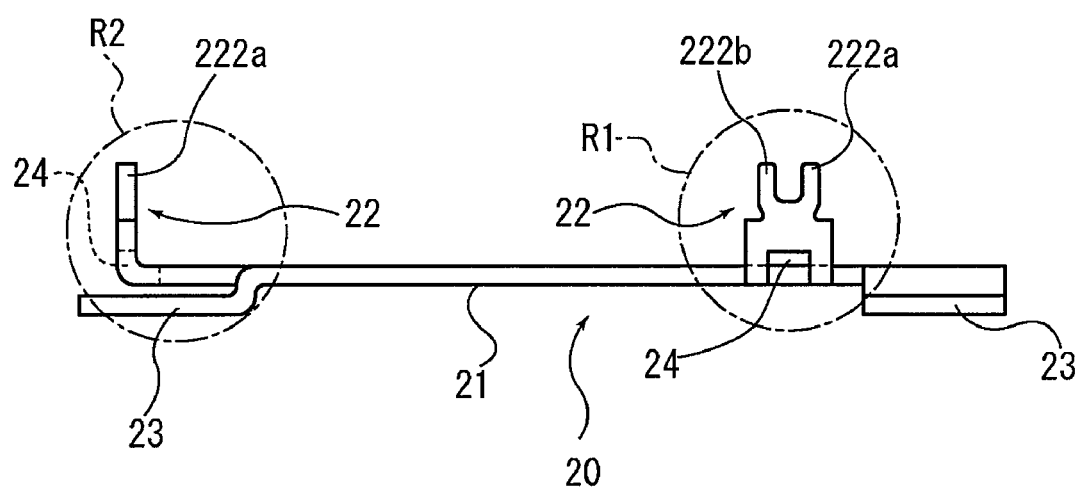
FIG. 3 is a side view of the attachment plate in accordance with a preferred embodiment of the present invention.
Figure 4:
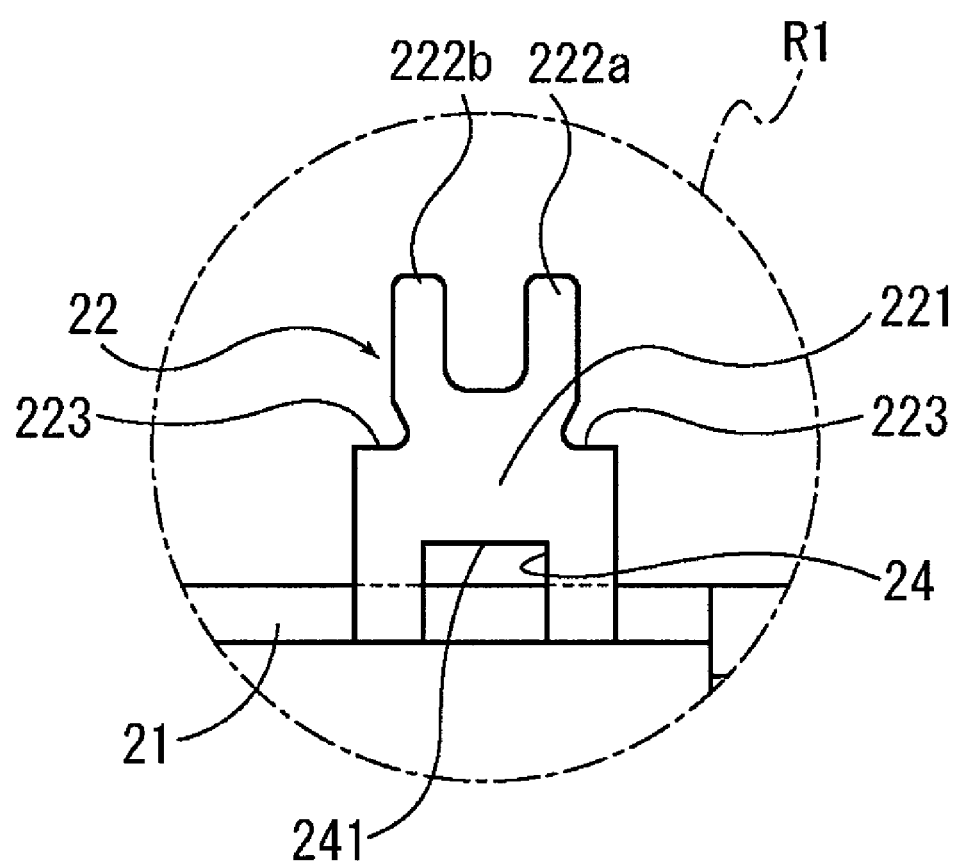
FIG. 4 is a partially enlarged view of the attachment plate shown in FIG. 3.
Figure 5:
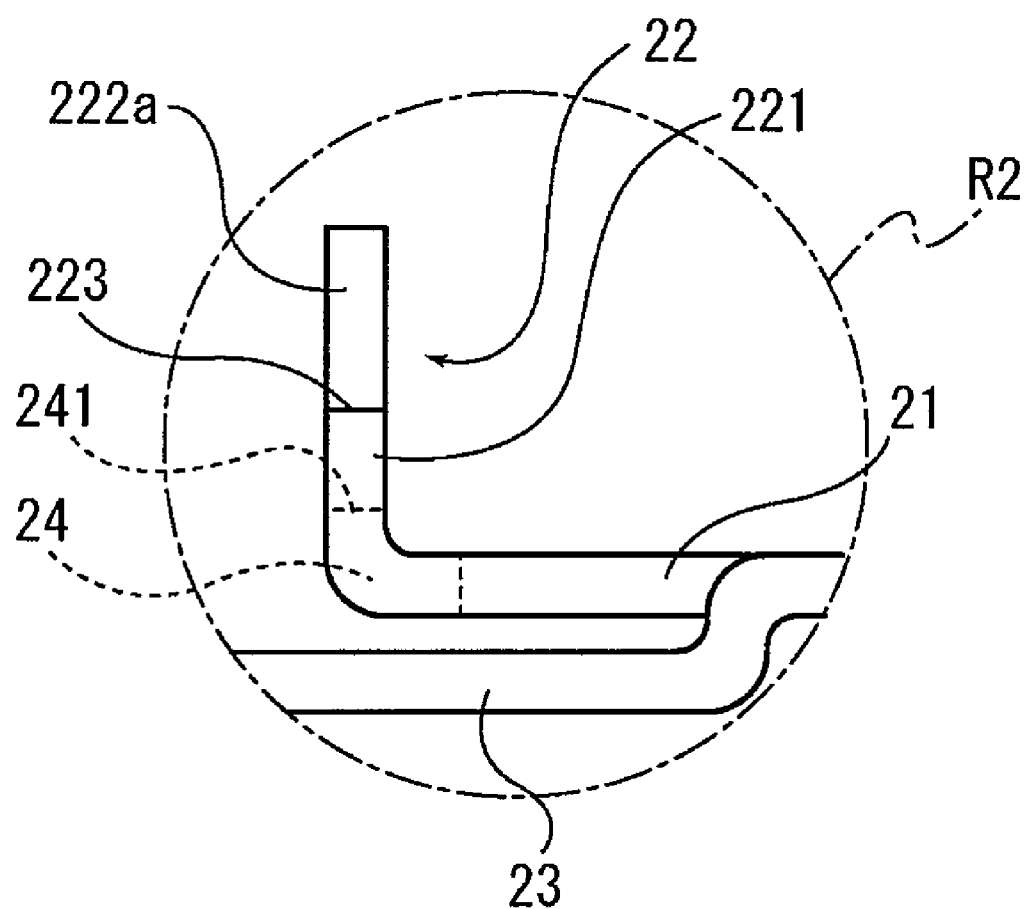
FIG. 5 is a partially enlarged view of the attachment plate shown in FIG. 3.

Hereinafter, the configuration of the attachment plate 20 will be described with reference to FIGS. 2 through 5. FIG. 2 is a top plan view of the attachment plate 20. FIG. 3 is a side view of the attachment plate 20 as viewed in the direction of arrow A in FIG. 2. FIG. 4 is a partially enlarged view of the attachment plate 20, showing the region designated by R1 in FIG. 3. FIG. 5 is a partially enlarged view of the attachment plate 20, showing the region designated by R2 in FIG. 3.

FIGS. 2 to 5 illustrate the shape of the attachment plate 20 prior to fixing the circuit board 30 to the attachment plate 20. After the circuit board 30 is assembled to the attachment plate 20, the shape of the attachment plate 20 is changed from those illustrated in FIG. 2 to 5. The shape of the attachment plate 20 after the circuit board 30 is assembled to the attachment plate 20 will be discussed later.

As shown in FIGS. 2 and 3, the attachment plate 20 includes a base portion 21, a plurality of fixing portions 22 and a plurality of motor attachment portions 23. The attachment plate 20 is preferably formed by pressing a metal plate, as a result of which the respective constituent elements of the attachment plate 20 are integrally formed with one another. The attachment plate 20 has apertures 24 formed in the boundary regions between the base portion 21 and the respective fixing portions 22.

The base portion 21 is perpendicular to the rotational axis J1 and preferably has a plate shape. A circular center hole 25 is formed in the base portion 21 in a concentric relationship with the rotational axis J1. The cylinder portion 13a of the housing 13 is inserted into the center hole 25. A plurality of housing attachment holes 26 is formed around the center hole 25. The housing attachment holes 26 are smaller in diameter than the center hole 25. The housing attachment holes 26 are used to fix the housing 13 and the attachment plate 20 together. A plurality of projections corresponding to the housing attachment holes 26 is formed in the flange portion 13b of the housing 13. The housing 13 is fixed to the attachment plate 20 by inserting the projections formed in the flange portion 13b into the housing attachment holes 26 and then pressure-deforming the projections thus inserted into the housing attachment holes 26.

The housing 13 and the attachment plate 20 may be fixed together via screws, for example. In this case, the flange portion 13b is provided with through holes to which the screws are fastened.

The fixing portions 22 extend parallel to the rotational axis J1 and have a plate shape before the circuit board is assembled to the attachment plate 20. The fixing portions 22 are formed by upwardly bending marginal regions of the base portion 21. The fixing portions 22 are used in fixing the circuit board 30 to the attachment plate 20. Although the fixing portions 22 are preferably provided at four points of the attachment plate 20 in the present preferred embodiment, for example, the position and number of the fixing portions 22 may be changed depending on the position and shape of the wiring formed in the circuit board 30, the shape of the attachment plate 20, or the like.

As shown in FIGS. 4 and 5, each of the fixing portions 22 includes an arm portion 221, a first protrusion 222a, a second protrusion 222b and a support portion 223. The arm portion 221 extends parallel or substantially parallel to the rotational axis J1 is of a plate shape. The first protrusion 222a and the second protrusion 222b are formed in such a manner as to protrude upwardly from the tip end of the arm portion 221 before the circuit board is assembled to the attachment plate 20. In other words, before the circuit board is assembled to the attachment plate 20, the first protrusion 222a and the second protrusion 222b are formed in a coplanar relationship with the arm portion 221.

The support portion 223 is formed on the opposite sides of the tip end of the arm portion 221 and is formed of a surface perpendicular or substantially perpendicular to the rotational axis J1. The support portion 223 is formed in a higher position than the base portion 21. As is apparent from the above, the fixing portions 22 have a plate shape when the circuit board 30 is not yet fixed by the fixing portions 22. This makes it possible to easily produce the fixing portions 22 by a press work.

The motor attachment portions 23 extend perpendicularly or substantially perpendicularly to the rotational axis J1 and preferably have a plate shape. The motor attachment portions 23 are formed in a lower position than the base portion 21. A motor fixing hole 231 for use in mounting the brushless motor 10 to a motor-carrying device is formed in each of the motor attachment portions 23. Although the motor attachment portions 23 are preferably provided at four points of the attachment plate 20 in the present preferred embodiment, the position and number of the motor attachment portions 23 may be changed depending on the position in which the brushless motor 10 is mounted to the motor-carrying device.

The apertures 24 are through holes formed to penetrate the attachment plate 20. The apertures 24 are formed in the boundary regions between the fixing portions 22 and the base portion 21 where the attachment plate 20 is bent. Inserted into each of the apertures 24 is a jig 42 (see FIGS. 12 and 13) for supporting the attachment plate 20 from below when the circuit board 30 is fixed to the attachment plate 20. As shown in FIGS. 4 and 5, an exposure surface 241 extending substantially perpendicularly to the rotational axis J1 and exposed in a downward direction is formed on the inner circumferential surface of each of the apertures 24.

Configuration of Circuit Board

Figure 6:
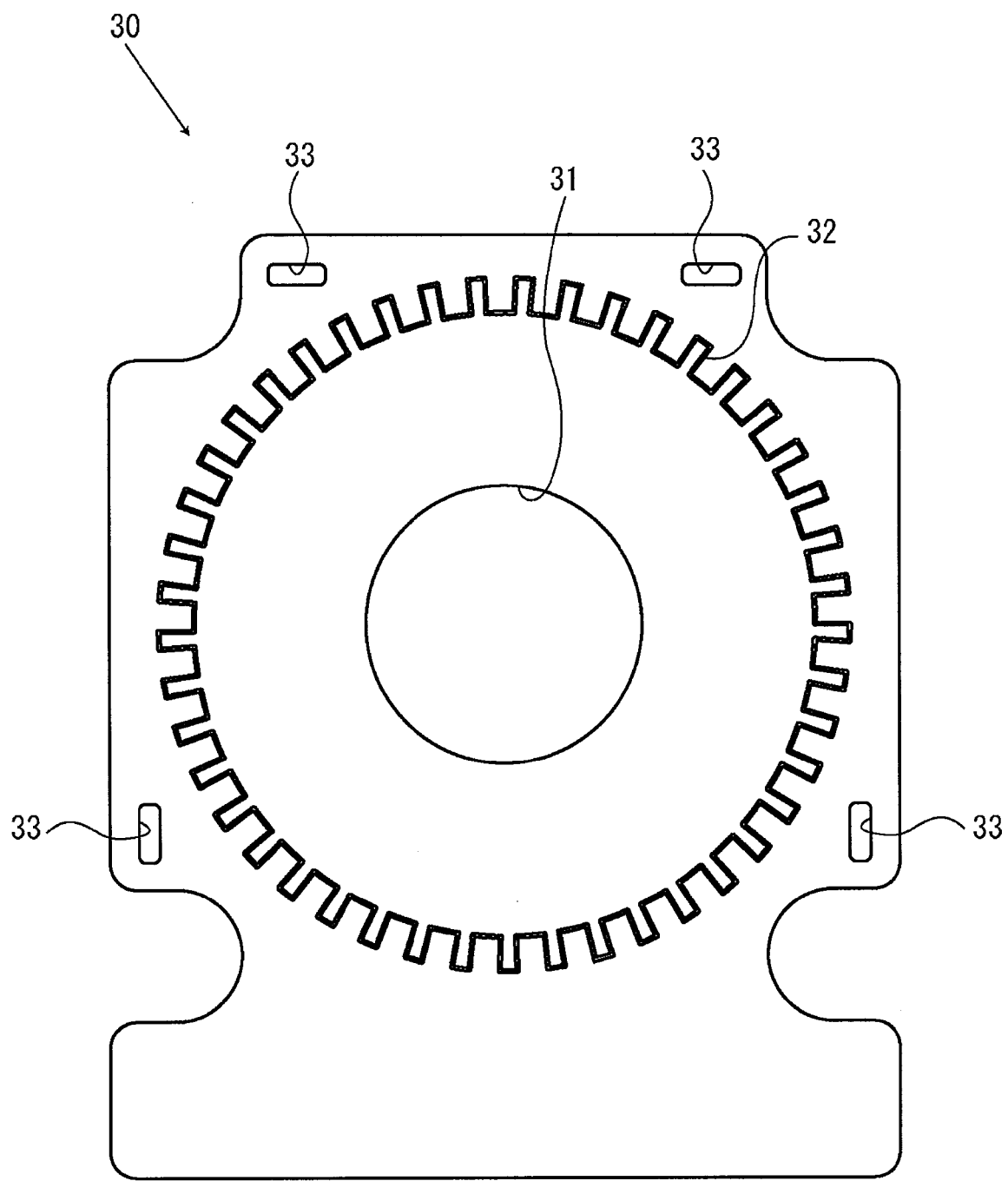
FIG. 6 is a top plan view of a circuit board in accordance with a preferred embodiment of the present invention.

Hereinafter, the circuit board 30 will be described with reference to FIG. 6, which is a top plan view of the circuit board 30. A center hole 31, a frequency generator coil pattern 32 and a plurality of through holes 33 are formed in the circuit board 30. In the circuit board 30 shown in FIG. 6, there are not illustrated an interface for connection with a control unit (not shown) and a coil wiring for supply of an electric current to the coil 15.

The center hole 31 is a circular through hole formed in a concentric relationship with the rotational axis J1. The cylinder portion 13a of the housing 13 is inserted into the center hole 31.

The frequency generator coil pattern 32 is an annular coil pattern formed in a concentric relationship with the rotational axis J1. The frequency generator coil pattern 32 is formed in a position where it faces toward the lower end surface of the cylinder portion 121b of the rotor holder 121 shown in FIG. 1. The lower end surface of the rotor magnet 122 is alternately magnetized with an N-pole and an S-pole so that the rotor magnet 122 can serve as a frequency generation magnet. As the rotor 12 rotates, the position of the magnetic poles of the frequency generation magnet is changed to thereby generate a frequency generation signal in the frequency generator coil pattern 32.

The through holes 33 are holes through which the first protrusion 222a and the second protrusion 222b of the attachment plate 20 are inserted when fixing the circuit board 30 to the attachment plate 20. As shown in FIG. 6, the through holes 33 are formed radially outwardly of the annular frequency generator coil pattern 32. In other words, the through holes 33 are not formed in the vicinity of the center hole 31 but in the peripheral edge region of the circuit board 30.

The direction in which the through holes 33 extend coincides with the direction in which the first protrusion 222a and the second protrusion 222b extend. This is to reduce, as much as possible, the size of the through holes 33 required to allow the first protrusion 222a and the second protrusion 222b to pass the through holes 33 when the fixing portions 22 are inserted into the through holes 33 in the fixing process of the circuit board 30. By doing do, it is possible to prevent reduction in the strength of the circuit board 30 which would otherwise occur due to the formation of the through holes 33.

Circuit Board Fixing Method

Figure 7:
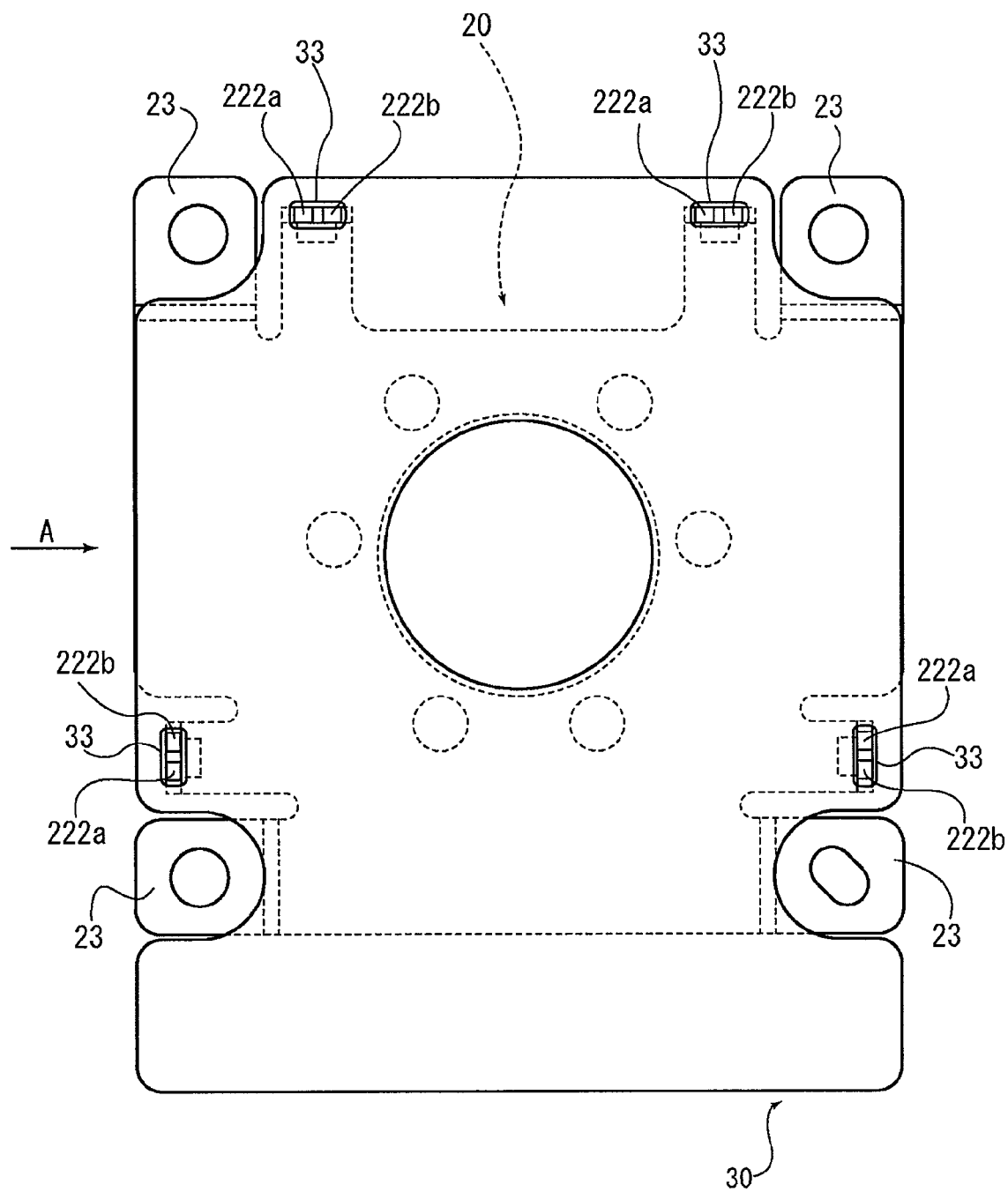
FIG. 7 is a top plan view of the attachment plate and the circuit board when the circuit board is placed on the attachment plate.
Figure 8:
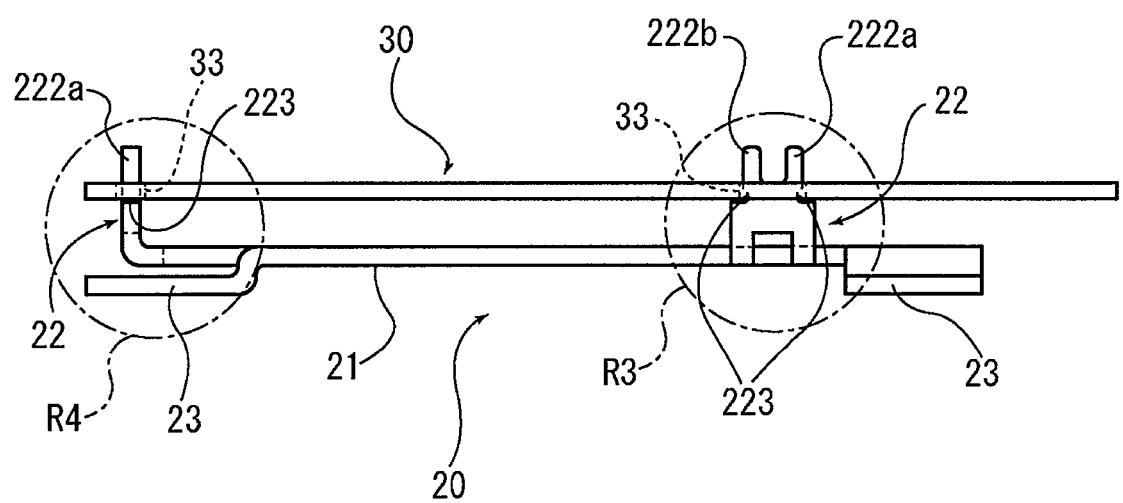
FIG. 8 is a side view of the attachment plate and the circuit board when the circuit board is placed on the attachment plate.
Figure 9:
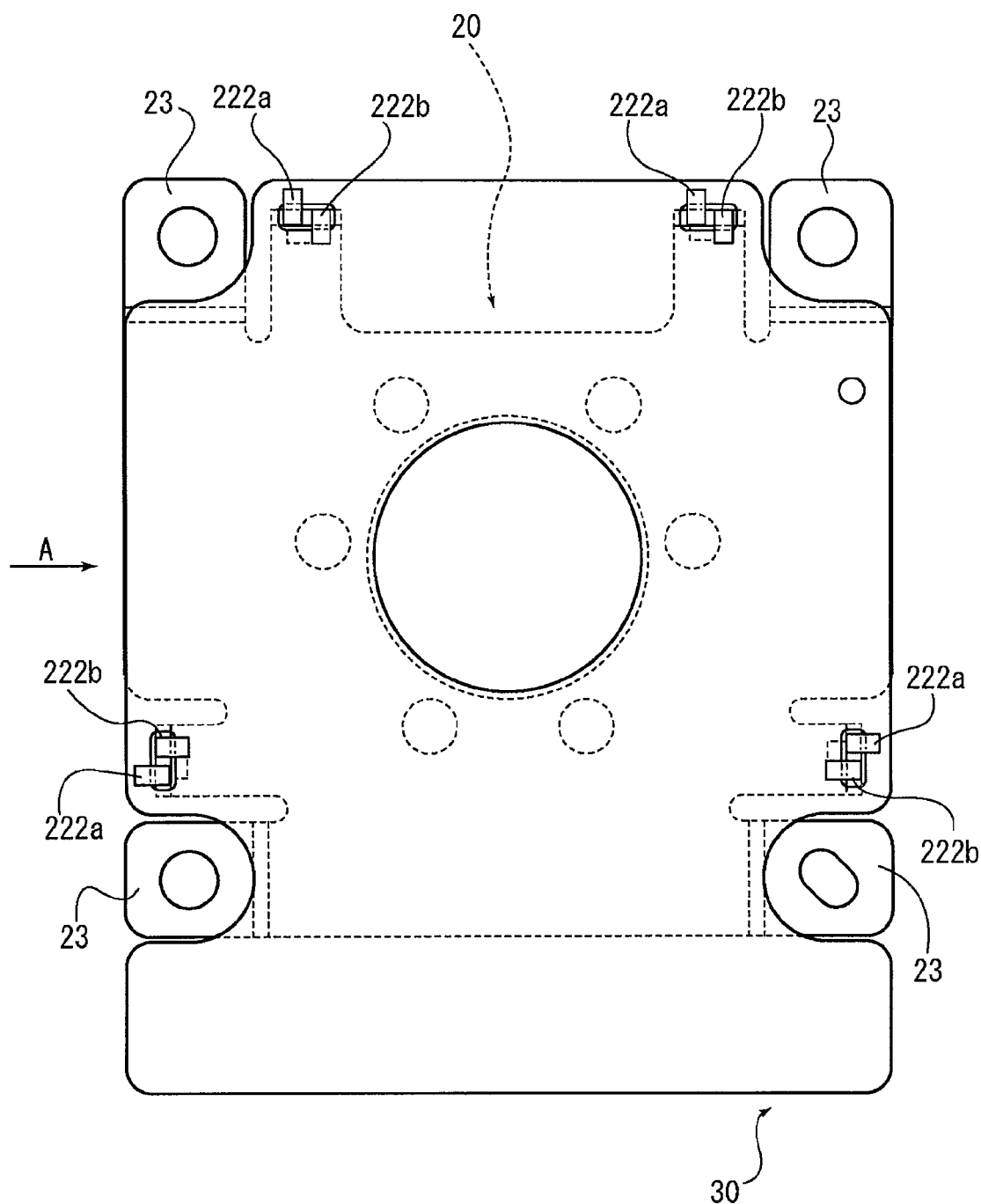
FIG. 9 is a top plan view of the attachment plate and the circuit board when the circuit board is fixed to the attachment plate according to a first preferred embodiment of the present invention.
Figure 10:
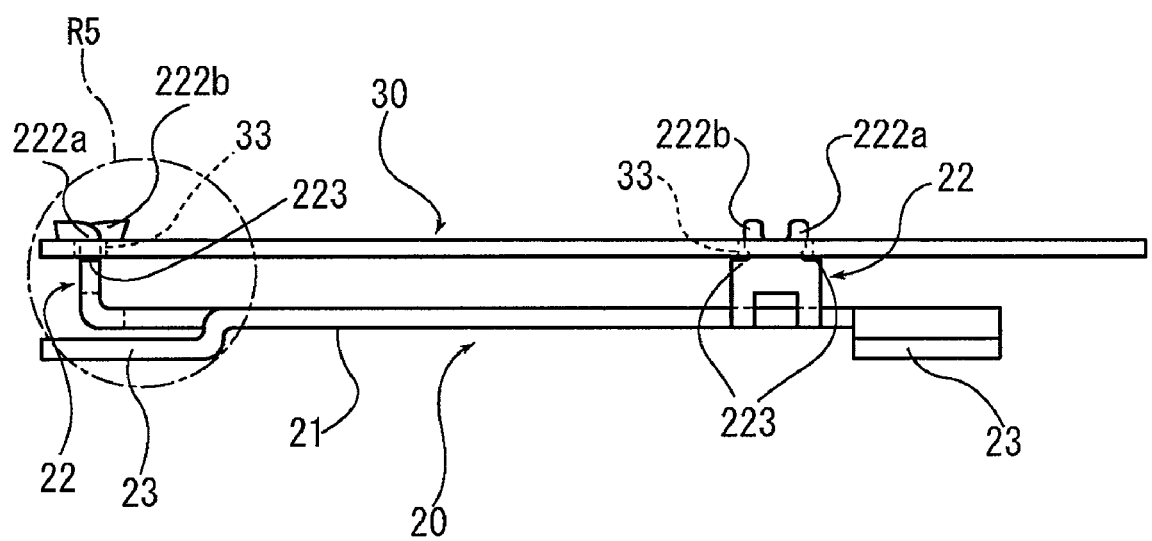
FIG. 10 is a side view of the attachment plate and the circuit board when the circuit board is fixed to the attachment plate according to the first preferred embodiment of the present invention.
Figure 11:
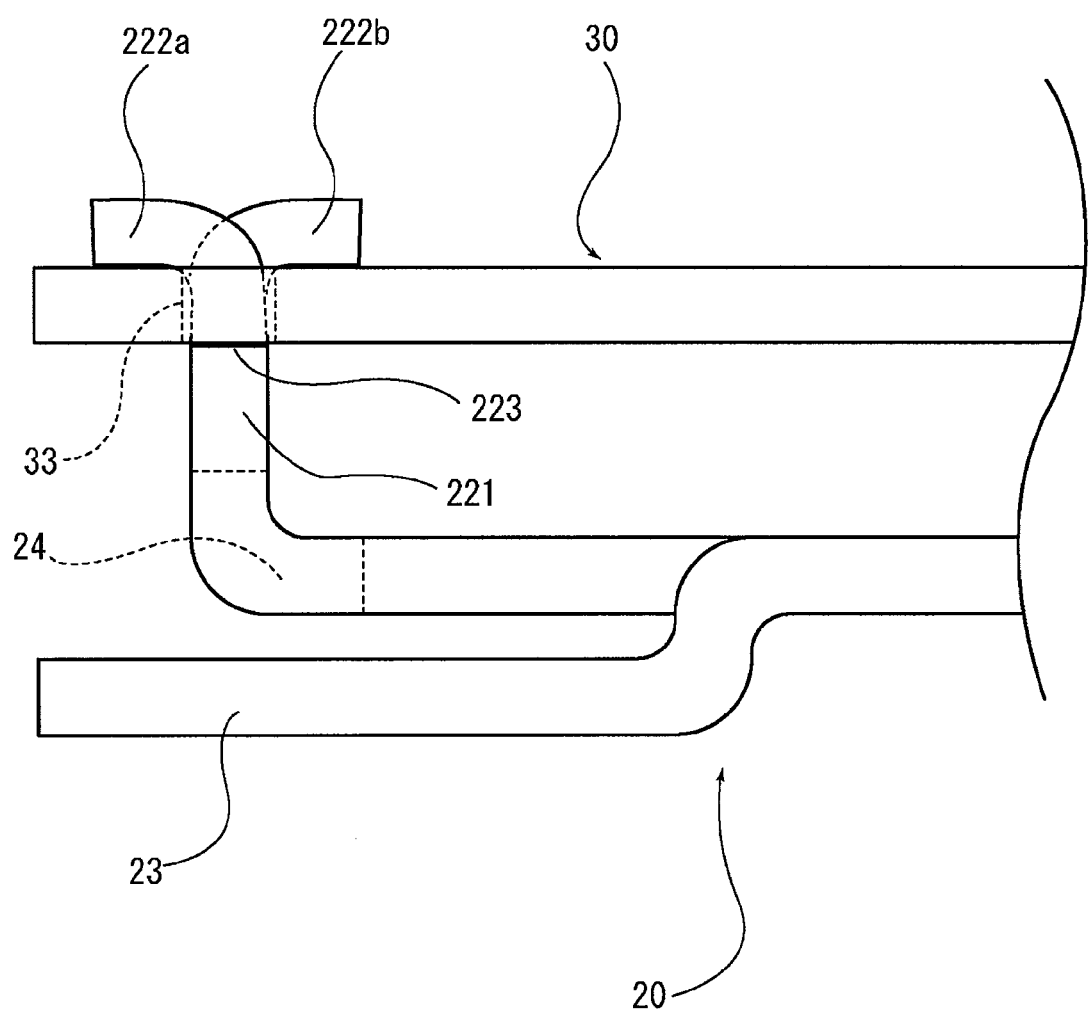
FIG. 11 is a partially enlarged view of the attachment plate and the circuit board shown in FIG. 10.

Hereinafter, a method of fixing the circuit board 30 to the attachment plate 20 will be described with reference to FIGS. 7 to 11. FIG. 7 is a top plan view of the attachment plate 20 and the circuit board 30 when the circuit board 30 is assembled on the attachment plate 20. FIG. 8 is a side view of the attachment plate 20 and the circuit board 30 as viewed in the direction of arrow A in FIG. 7. FIG. 9 is a top plan view of the attachment plate 20 and the circuit board 30 when the circuit board 30 is assembled to the attachment plate 20. FIG. 10 is a side view of the attachment plate 20 and the circuit board 30 as viewed in the direction of arrow A in FIG. 9. FIG. 11 is a partially enlarged view of the attachment plate 20 and the circuit board 30, showing the region designated by R5 in FIG. 10.

The frequency generator coil pattern 32 formed in the circuit board 30 is omitted from illustration in FIGS. 7 and 9.

In order to fix the circuit board 30 to the attachment plate 20, the attachment plate 20 and the circuit board 30 are first brought into positional alignment with each other. In other words, the first protrusion 222a and the second protrusion 222b of the attachment plate 20 are inserted into each of the through holes 33 of the circuit board 30 from below the circuit board 30. Then, as shown in FIGS. 7 and 8, the circuit board 30 is placed on the attachment plate 20 so that the lower surface of the circuit board 30 can make contact with the support portion 223 of the attachment plate 20. At this time, the first protrusion 222a and the second protrusion 222b protrude above the circuit board 30. Since the support portion 223 is positioned higher than the base portion 21, a space is created between the attachment plate 20 and the circuit board 30. Presence of the space makes it possible to mount a Hall element or other components on the lower surface of the circuit board 30.

Next, the overhang extensions of the first protrusion 222a and the second protrusion 222b that protrude above the circuit board 30 are bent in a direction perpendicular to a plate surface of the arm portion 221. At this time, the first protrusion 222a and the second protrusion 222b are bent in directions opposite to each other as illustrated in FIGS. 9 and 10. By doing so, the circuit board 30 is fixed to the attachment plate 20.

Next, the shape of the fixing portions 22 in a state that the circuit board 30 is fixed to the attachment plate 20 will be described in detail with reference to FIG. 11. As shown in FIG. 11, the overhang extension of the first protrusion 222a protruding above the circuit board 30 is bent in a direction perpendicular to the plate surface of the arm portion 221. Therefore, the first protrusion 222a is provided at its tip end with a hook-like bent extension. The bent extension of the first protrusion 222a comes into contact with the upper surface of the circuit board 30. This holds true in case of the second protrusion 222b. As mentioned above, the lower surface of the circuit board 30 remains in contact with the support portion 223. Therefore, the upward and downward movement of the circuit board 30 is restrained as the first protrusion 222a and the second protrusion 222b are bent in a direction perpendicular to the plate surface of the arm portion 221.

As set forth above, the first protrusion 222a and the second protrusion 222b are bent in directions opposite to each other. In other words, as shown in FIG. 11, the first protrusion 222a is bent toward the peripheral edge of the circuit board 30 and the second protrusion 222b is bent in a direction opposite to the bending direction of the first protrusion 222a. Thus, the circuit board 30 is held against movement in the direction perpendicular to the rotational axis J1.

Only one of the plurality of fixing portions 22 formed in the attachment plate 20 is enlargedly shown in FIG. 11. In the remaining fixing portions 22, the first protrusion 222a and the second protrusion 222b are bent in the same manner as noted above, thereby restraining movement of the circuit board 30. By restraining movement of the circuit board 30 at plural points in this manner, the circuit board 30 is fixed to the attachment plate 20.

Bending Work of Protrusion Portion

Hereinafter, a bending work of the first protrusion 222a and the second protrusion 222b will be described in more detail with reference to FIGS. 12 through 14.

Figure 12:
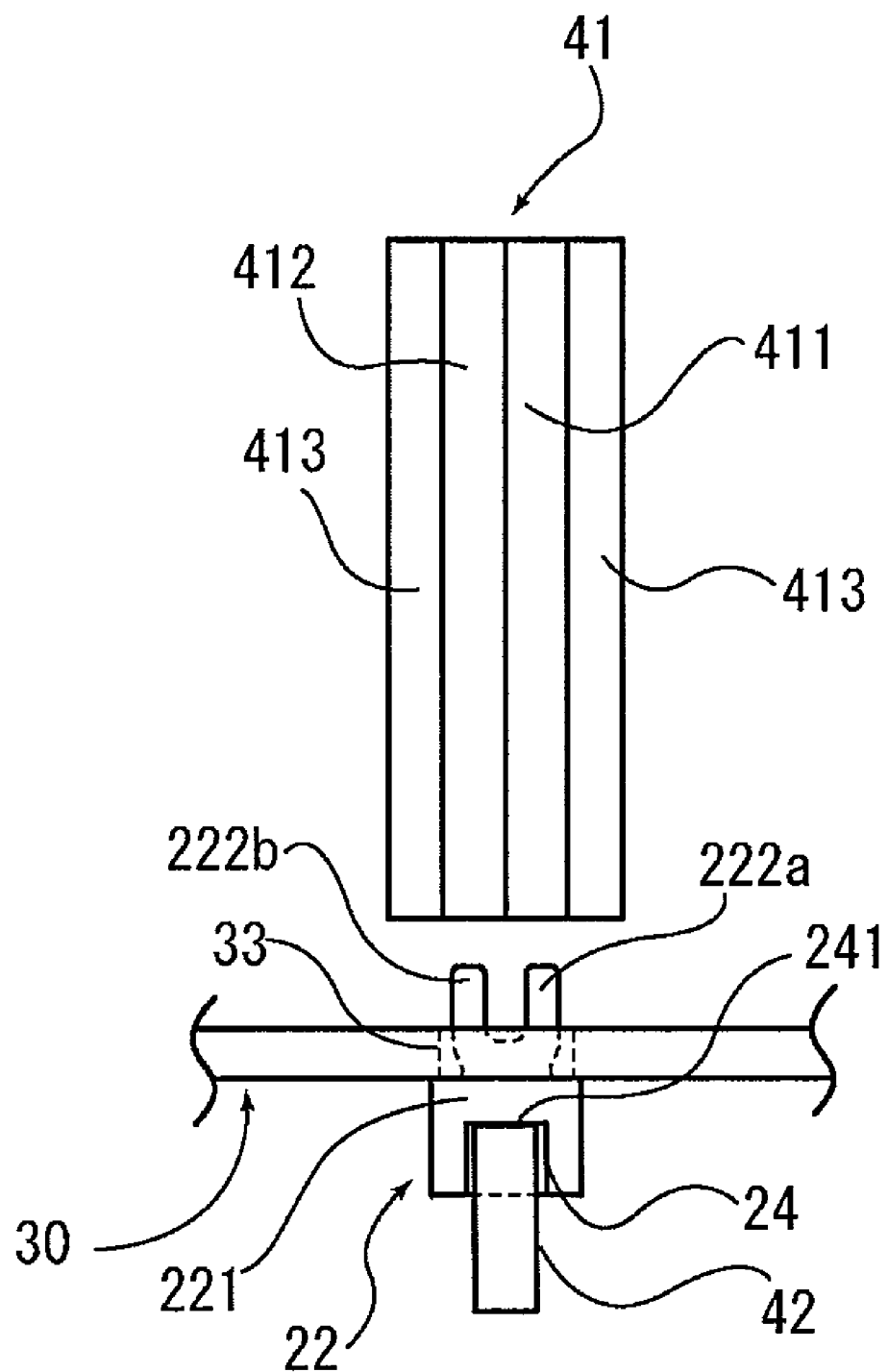
FIG. 12 is a view showing an arrangement of jigs according to the first preferred embodiment of the present invention.

FIG. 12 is a view showing a state that jigs are arranged with respect to the fixing portion 22 in the region designated by R3 in FIG. 8. FIG. 13 is a view showing a state that jigs are arranged with respect to the fixing portion 22 in the region designated by R4 in FIG. 8. FIG. 14 is a view illustrating deformation plates 411 and 412 that constitute a pressing jig 41. In FIGS. 12 and 13, the motor attachment portion 23 and the like are omitted from illustration. In FIG. 13, restriction plates 413 are omitted from illustration.

Figure 13:
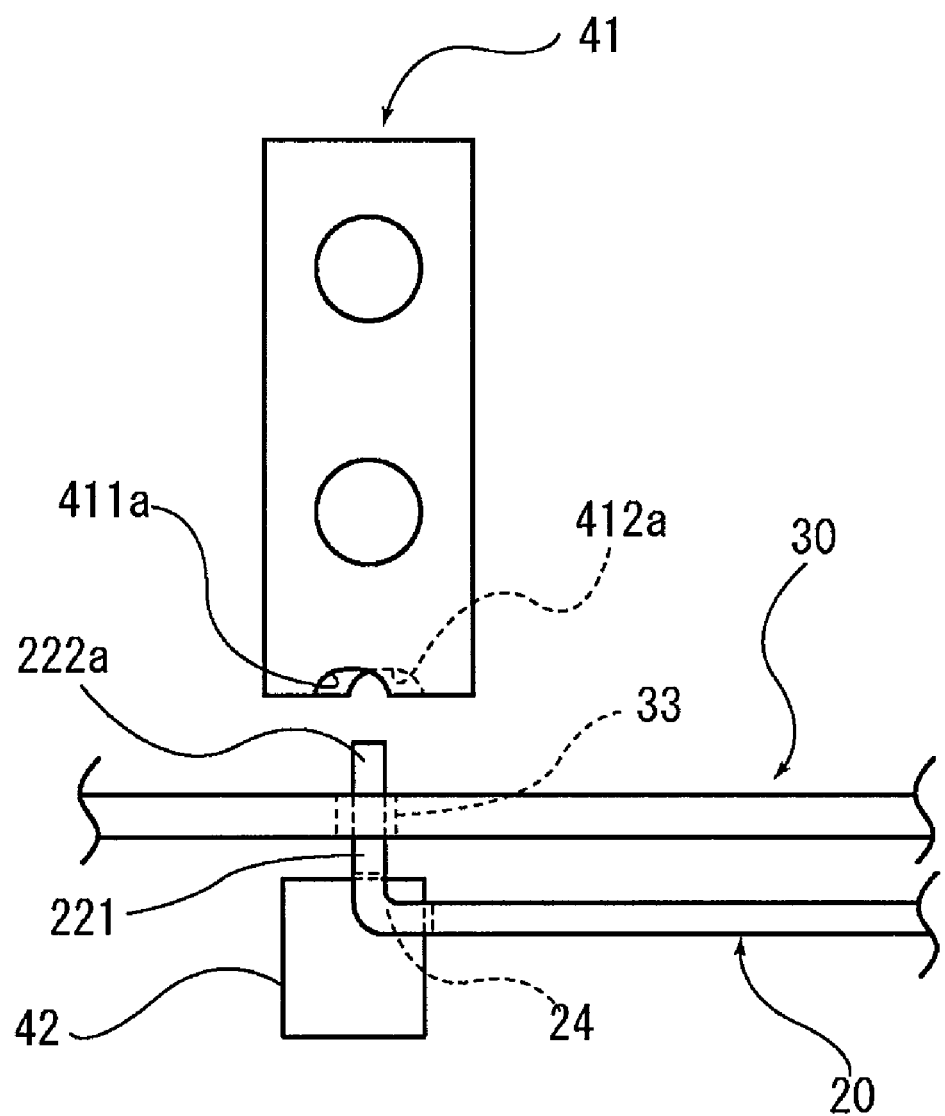
FIG. 13 is a view showing an arrangement of jigs according to the first preferred embodiment of the present invention.
Figure 14:
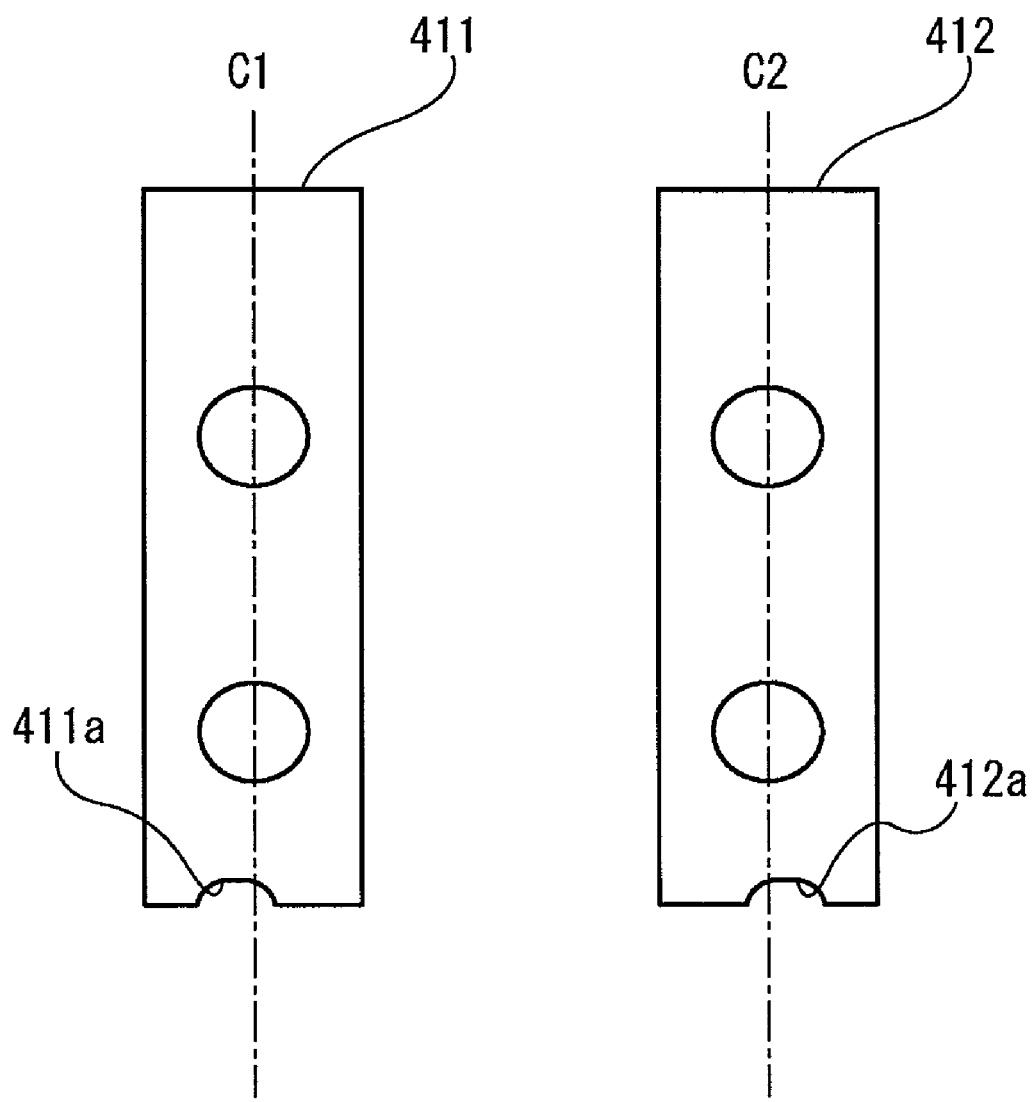
FIG. 14 is a view illustrating the shape of deformation plates forming a pressing jig according to the first preferred embodiment of the present invention.

Referring to FIGS. 12 and 13, the first protrusion 222a and the second protrusion 222b are bent via a pressing jig 41 and a supporting jig 42. The pressing jig 41 presses the first protrusion 222a and the second protrusion 222b from above. The supporting jig 42 is a rectangular solid and is adapted to support the attachment plate 20 from below.

Next, the pressing jig 41 will be described in detail. As shown in FIG. 12, the pressing jig 41 includes two deformation plates 411 and 412 and two restriction plates 413. The deformation plate 411 is used in bending the first protrusion 222a. On the lower surface of the deformation plate 411, there is formed a recess portion 411a in a position deviated from the center line C1 as shown in FIG. 14. The deformation plate 412 is used in bending the second protrusion 222b. On the lower surface of the deformation plate 412, there is formed a recess portion 412a in a position deviated from the center line C2 as shown in FIG. 14. The restriction plates 413 serve to restrict the bending directions of the first protrusion 222a and the second protrusion 222b.

Referring to FIG. 12, the pressing jig 41 is constructed by laying the deformation plates 411 and 412 and the restriction plates 413 one over another. At this time, the deformation plates 411 and 412 are overlapped so that the recess portions 411a and 412a thereof is deviated from each other.

Next, description will be made on a bending work of the first protrusion 222a and the second protrusion 222b using the pressing jig 41 and the supporting jig 42.

First, the pressing jig 41 is arranged above the circuit board 30 as shown in FIGS. 12 and 13. In other words, the pressing jig 41 is arranged so that the recess portions 411a and 412a can lie just above the first protrusion 222a and the second protrusion 222b, respectively. The supporting jig 42 is inserted into the corresponding one of the apertures 24 formed in the attachment plate 20.

Then, the pressing jig 41 is slowly moved downwards. By making contact with the inner circumferential surfaces of the recess portions 411a and 412a, the first protrusion 222a and the second protrusion 222b are bent in a direction perpendicular to the plate surface of the arm portion 221. At this time, the first protrusion 222a and the second protrusion 222b are bent in directions opposite to each other because the recess portions 411a and 412a are differently positioned. Since the pressing jig 41 does not make contact with the circuit board 30 at this time, no force is directly applied to the circuit board 30 from above.

When the pressing jig 41 makes contact with the first protrusion 222a and the second protrusion 222b, the supporting jig 42 comes into contact with the exposure surface 241 of the corresponding one of the apertures 24 at its upper surface. Thus, the supporting jig 42 supports the attachment plate 20 from below during the bending operation of the first protrusion 222a and the second protrusion 222b. Therefore, no downwardly acting force is directly applied to the circuit board 30.

After moving to a specified position, the pressing jig 41 is returned back to an original position. As a result, the first protrusion 222a and the second protrusion 222b are bent in a direction perpendicular to the plate surface of the arm portion 221.

The bending work of the first protrusion 222a and the second protrusion 222b is simultaneously performed with respect to all of the fixing portions 22. As compared to a brushless motor in which the circuit board 30 is screw-fixed to the attachment plate 20, the brushless motor 10 of the present preferred embodiment is capable of reducing the number of steps required in fixing the circuit board 30 to the attachment plate 20.

Owing to the fact that the afore-mentioned bending work is simultaneously performed with respect to all of the fixing portions 22, it is possible to suppress generation of a warp in the circuit board 30. This makes it possible to accurately acquire a hall signal and a frequency generation signal when the brushless motor 10 is driven.

As described above, with the brushless motor 10 of the present preferred embodiment, the plurality of through holes 33 is formed in the circuit board 30 and the fixing portions 22 are formed in the attachment plate 20. The first protrusion 222a and the second protrusion 222b of each of the fixing portions 22 are inserted into the through holes 33. The overhang extensions of the first protrusion 222a and the second protrusion 222b protruding above the circuit board 30 are bent in a direction perpendicular to the plate surface of the arm portion 221. At this time, the first protrusion 222a and the second protrusion 222b of each of the fixing portions 22 are bent in directions opposite to each other. This makes it possible to suppress generation of vibration and flexural deformation in the circuit board 30, as compared to a case where the circuit board 30 is fixed only in its region adjacent to the rotational axis J1.

Owing to the fact that the circuit board 30 is fixed in its region outside the annular frequency generator coil pattern 32, it is possible to suppress generation of vibration in the region of the circuit board 30 in which the frequency generator coil pattern 32 is formed. This makes it possible to accurately acquire a frequency generation signal and a hall signal.

Furthermore, the circuit board 30 is fixed to the attachment plate 20 by simultaneously bending the first protrusion 222a and the second protrusion 222b of each of the fixing portions 22 without directly applying a force to the circuit board 30. This makes it possible to reduce the number of parts and the number of production steps, as compared to a case where the circuit board 30 is fixed to the attachment plate 20 by means of screws. It is also possible to prevent generation of cracks in the circuit board 30, which would otherwise occur when the circuit board 30 is fixed to the attachment plate 20.

Figure 15:
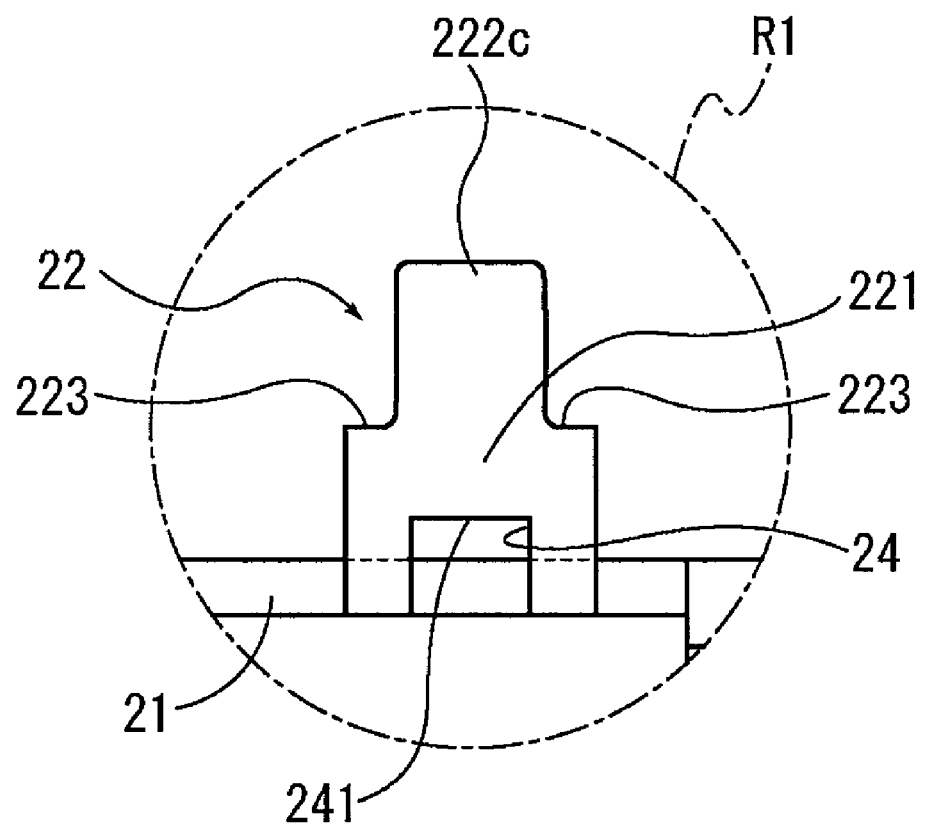
FIG. 15 is a view showing a modified example of a fixing portion according to the first preferred embodiment of the present invention.

Although the first protrusion 222a and the second protrusion 222b are formed in each of the fixing portions 22 according to the present preferred embodiment, the present invention is not limited thereto. As an alternative example, it may be possible to form a single projection 222c in each of the fixing portions 22 as illustrated in FIG. 15. In this case, it is equally possible to fix the circuit board 30 to the attachment plate 20 by bending the overhang extension of the projection 222c that protrudes above the circuit board 30. If the attachment plate 20 having the projection 222c is used in fixing the circuit board 30, however, the circuit board 30 is apt to be warped as compared to the case where the attachment plate 20 shown in FIGS. 2 and 3 is used. For that reason, it is desirable that the circuit board 30 be fixed using the attachment plate 20 with the first protrusion 222a and the second protrusion 222b.

In case of using the attachment plate 20 with the projection 222c, it is preferred that the projection 222c be bent toward the peripheral edge of the circuit board 30. This is because the circuit board 30 may possibly be warped or cracked if the projection 222c is bent inwardly of the circuit board 30 in all of the fixing portions 22.

Second Preferred Embodiment

Hereinafter, description will be made of a second preferred embodiment of the present invention. The brushless motor 10 of the present preferred embodiment differs from the brushless motor 10 of the first preferred embodiment in the bending direction of the first protrusion 222a and the second protrusion 222b. In other words, the region indicated by a dot line circle in FIG. 1 has a different shape in the present preferred embodiment. The brushless motor 10 of the present preferred embodiment will now be described in detail by bringing a focus on the differing point.

The brushless motor 10, the attachment plate 20 and the circuit board 30 of the present preferred embodiment are the same in configuration as the brushless motor 10, the attachment plate 20 and the circuit board 30 of the first preferred embodiment. Therefore, no detailed description will be offered in that regard.

Fixing Method of Attachment Plate

Figure 16:
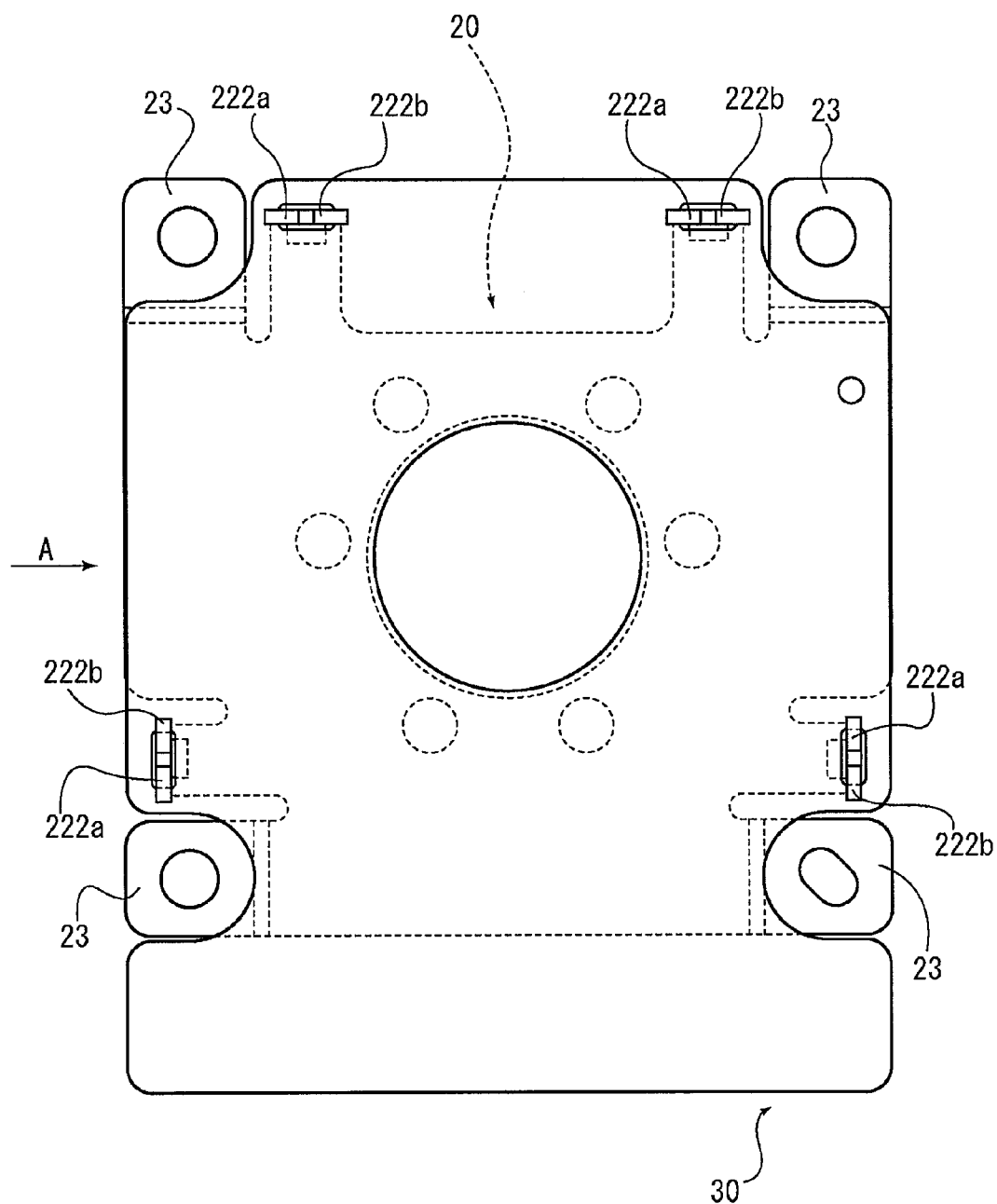
FIG. 16 is a top plan view of the attachment plate and the circuit board when the circuit board is fixed to the attachment plate according to a second preferred embodiment of the present invention.
Figure 17:
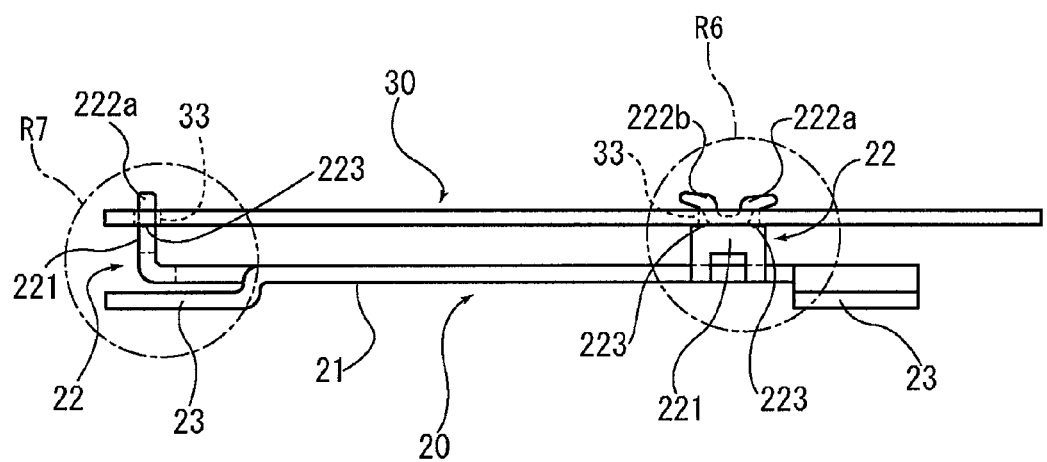
FIG. 17 is a side view of the attachment plate and the circuit board when the circuit board is fixed to the attachment plate according to the second preferred embodiment of the present invention.
Figure 18:
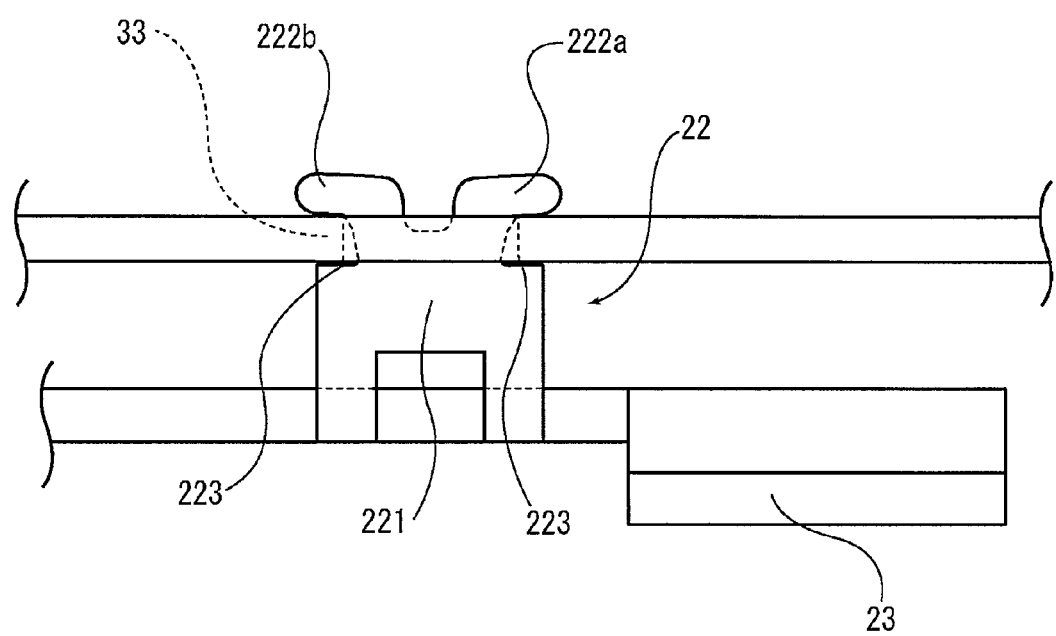
FIG. 18 is a partially enlarged view of the attachment plate and the circuit board shown in FIG. 17.

Hereinafter, a method of fixing the circuit board 30 to the attachment plate 20 in the present preferred embodiment will be described with reference to FIGS. 16 through 18. FIG. 16 is a top plan view of the attachment plate 20 to which is fixed the circuit board 30. FIG. 17 is a side view of the attachment plate 20 and the circuit board 30 as viewed in the direction of arrow A in FIG. 16. FIG. 18 is a partially enlarged view of the attachment plate 20 and the circuit board 30, showing the region designated by R6 in FIG. 17. In FIG. 16, the frequency generator coil pattern 32 and the like formed in the circuit board 30 are omitted from illustration.

Position alignment between the attachment plate 20 and the circuit board 30 is performed in the same manner as in the first embodiment. In the present preferred embodiment, however, the first protrusion 222a and the second protrusion 222b are bent in a direction parallel to the plate surface of the arm portion 221 as can be seen in FIGS. 16 and 17.

As shown in FIG. 18, the first protrusion 222a and the second protrusion 222b thus bent come into contact with the upper surface of the circuit board 30. The support portion 223 is in contact with the lower surface of the circuit board 30.

This restrains upward and downward movement of the circuit board 30. The first protrusion 222a and the second protrusion 222b are bent in directions opposite to each other. This restrains movement of the circuit board 30 in the direction perpendicular to the rotational axis J1. By bending the first protrusion 222a and the second protrusion 222b of each of the fixing portions 22 as illustrated in FIG. 18, the circuit board 30 is fixed to the attachment plate 20.

Bending Work of Protrusion Portion

Hereinafter, a bending work of the first protrusion 222a and the second protrusion 222b in the present preferred embodiment will be described in detail with reference to FIGS. 19 and 20.

Figure 19:
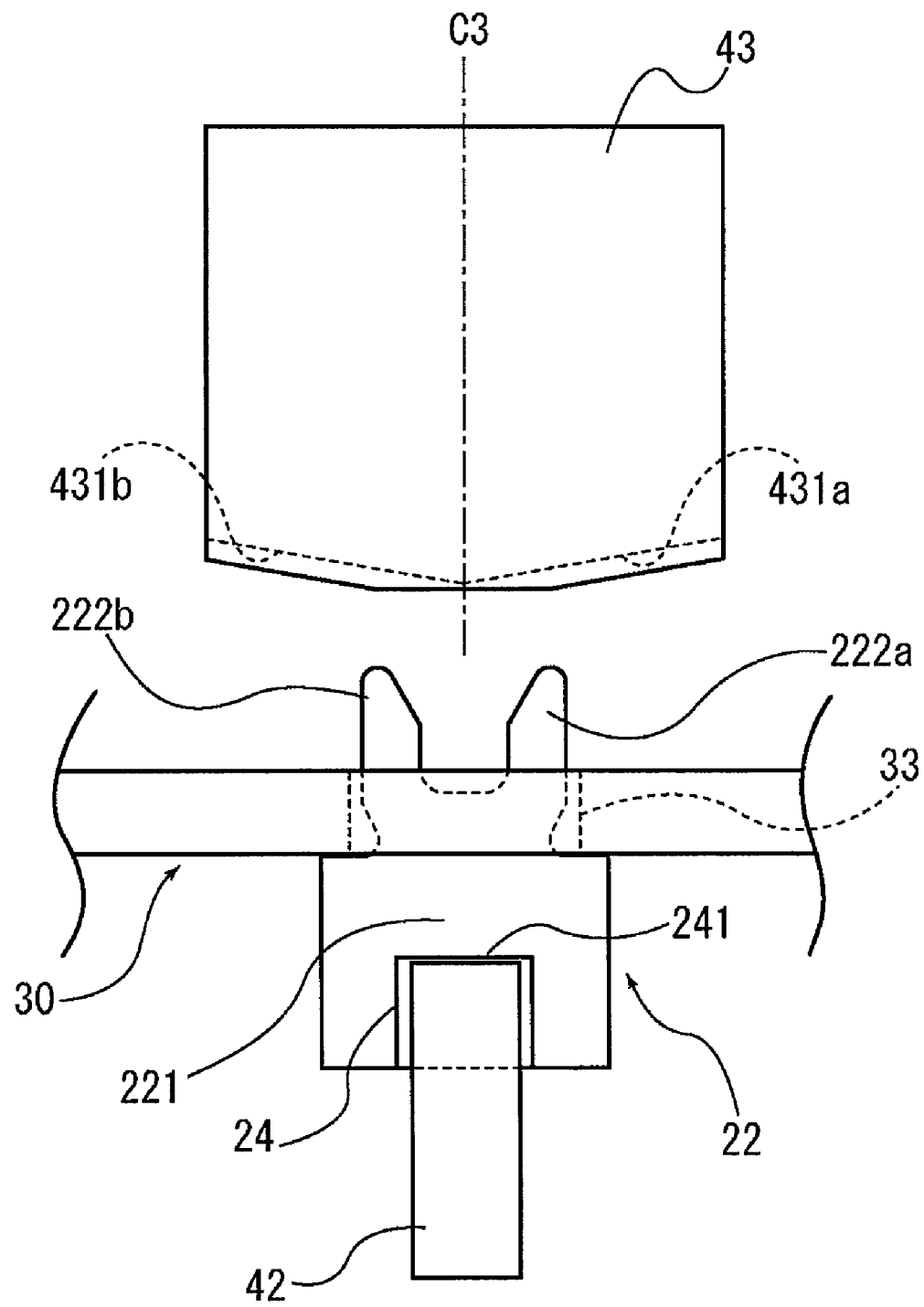
FIG. 19 is a view showing an arrangement of jigs according to the second preferred embodiment of the present invention.

FIG. 19 is a view showing a supporting jig 42 and a pressing jig 43 arranged with respect to one of the fixing portions 22 in the region designated by R3 in FIG. 8. FIG. 20 is a view showing the supporting jig 42 and the pressing jig 43 arranged with respect to one of the fixing portions 22 in the region designated by R4 in FIG. 8. In FIG. 20, the motor attachment portions 23 are omitted from illustration.

The pressing jig 43 presses the first protrusion 222a and the second protrusion 222b from above. As shown in FIG. 19, the pressing jig 43 has a V-shaped bottom portion. It can be also seen in FIGS. 19 and 20 that grooves 431a and 431b are formed on the lower surface of the pressing jig 43 in a symmetrical relationship with respect to the center line C3. The grooves 431a and 431b act to restrict the bending directions of the first protrusion 222a and the second protrusion 222b. The supporting jig 42 is the same as already described above in respect of the first embodiment and, therefore, will be omitted from further description.

Next, description will be made on the bending work of the first protrusion 222a and the second protrusion 222b according to the present preferred embodiment. First, the supporting jig 42 is inserted into the corresponding one of the apertures 24 formed in the attachment plate 20, and the pressing jig 43 is arranged above the circuit board 30. As shown in FIGS. 19 and 20, the pressing jig 43 is arranged so that the center line C3 thereof can lie between the first protrusion 222a and the second protrusion 222b and the center line C4 thereof can be aligned with the first protrusion 222a and the second protrusion 222b.

Figure 20:
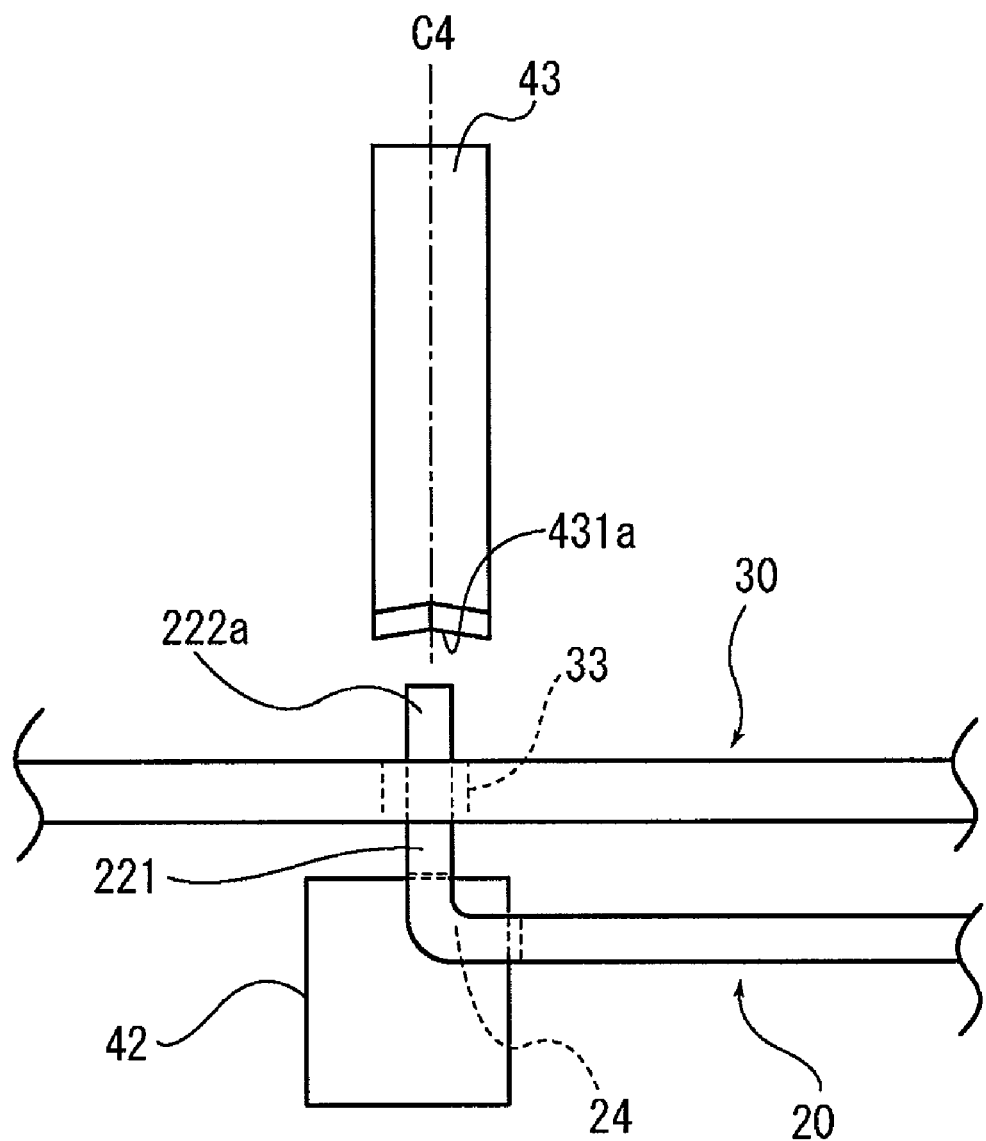
FIG. 20 is a view showing an arrangement of jigs according to the second preferred embodiment of the present invention.

The pressing jig 43 is slowly moved downwards from the state shown in FIGS. 19 and 20. By means of the pressing jig 43, the first protrusion 222a and the second protrusion 222b are bent away from each other into a direction parallel to the plate surface of the arm portion 221. In other words, the first protrusion 222a is bent in a right direction in FIG. 19 by making contact with the inner wall of the groove 431a, and the second protrusion 222b is bent in a left direction in FIG. 19 by making contact with the inner wall of the groove 431b. Since the pressing jig 43 does not make direct contact with the circuit board 30 at this time, no force is directly applied to the circuit board 30 from above.

When the pressing jig 43 comes into contact with the first protrusion 222a and the second protrusion 222b, the upper surface of the supporting jig 42 remains in contact with the exposure 241 of each of the apertures 24. In other words, the supporting jig 42 supports the attachment plate 20 from below when the first protrusion 222a and the second protrusion 222b undergo a bending operation. Therefore, no force is directly applied to the circuit board 30 from below.

In the present preferred embodiment, the force applied to the first protrusion 222a and the second protrusion 222b is smaller than the force applied in the bending work of the first embodiment. This is because, in the present preferred embodiment, there is no need to bend the first protrusion 222a and the second protrusion 222b into a rolled-up shape as is the case in the first preferred embodiment. Therefore, it is possible in the bending work of the present preferred embodiment to reduce the load borne by the circuit board 30, thereby effectively suppressing generation of warps or cracks in the circuit board 30.

The bending work of the present preferred embodiment is simultaneously performed with respect to all of the fixing portions 22. This makes it possible to reduce the number of parts and the number of production steps. It is also possible to prevent generation of cracks in the circuit board 30.

As described above, in the present preferred embodiment, the circuit board 30 is fixed by bending the first protrusion 222a and the second protrusion 222b, which are inserted into the through holes 33, in a direction parallel to the plate surface of the arm portion 221. As a consequence, it becomes possible to fix the circuit board 30 in its region other than the vicinity of the rotational axis J1, which makes it possible to suppress generation of vibration and warp in the circuit board 30.

Just like the first preferred embodiment, the through holes 33 are formed outside the frequency generator coil pattern 32, which assists in suppressing generation of vibration in the peripheral edge portion of the circuit board 30. Thus, the brushless motor 10 of the present preferred embodiment is capable of accurately acquiring a frequency generation signal and a hall signal.

In the present preferred embodiment, the force applied to the first protrusion 222a and the second protrusion 222b during the bending work can be rendered smaller than the force applied in the first preferred embodiment. This makes it possible to effectively suppress generation of damage or warp in the circuit board 30.

Although the first protrusion 222a and the second protrusion 222b are bent in contact with the upper surface of the circuit board 30 according to the first and second preferred embodiments described above, the present invention is not limited thereto. As an alternative example, the first protrusion 222a and the second protrusion 222b may be allowed to cut into the inner circumferential surface of each of the through holes 33 during the bending work. This makes it possible to reliably fix the circuit board 30 to the attachment plate 20. In this case, however, there is a possibility that the circuit board 30 may be damaged or warped. For that reason, it is desirable that the force applied to the first protrusion 222a and the second protrusion 222b be controlled depending on the strength of the circuit board 30, the position of the through holes 33 and so forth.

Furthermore, although the through holes 33 of the circuit board 30 are formed radially outwardly of the annular frequency generator coil pattern 32 according to the first and second preferred embodiments described above, the present invention is not limited thereto. As an alternative example, in case the frequency generator coil pattern 32 is not formed in the circuit board 30, the through holes 33 of the circuit board 30 may be formed radially outwardly of the rotor 12. This makes it possible to suppress generation of warp or vibration in the region of the circuit board 30 where a Hall element is arranged. Therefore, it becomes possible to accurately acquire a hall signal.

In addition, although the through holes 33 of the circuit board 30 are formed outside the frequency generator coil pattern 32 according to the first and second embodiments described above, it is desirable that a sufficiently great distance be left between the through holes 33 and the peripheral edge of the circuit board 30. This is because, if the distance between the through holes 33 and the peripheral edge of the circuit board 30 is not sufficiently secured, damage such as cracks or the like may be easily generated in the circuit board 30 due to the force indirectly applied to the circuit board 30 during the bending work.

While the present invention has been shown and described with respect to preferred embodiments thereof, it will be understood by those skilled in the art that various changes and modifications may be made without departing from the scope of the present invention as defined in the following claims.

What is claimed is:

1. A brushless motor comprising:
    a motor drive unit including a rotor rotatable about a rotational axis;
    a circuit board including a driving circuit arranged to drive the motor drive unit, the circuit board having an upper surface, a lower surface and a plurality of through holes formed in the upper surface and the lower surface; and
    a motor attachment plate including a plate-shaped base portion and plate-shaped fixing portions integral with the base portion, the base portion being arranged substantially parallel to the circuit board, the fixing portions being provided in a corresponding relationship with the through holes to fix the circuit board in place; wherein
    each of the fixing portions includes:
    a support portion arranged to make contact with a surface of the circuit board that faces the motor attachment plate to support the circuit board;
    an arm portion, extended from the support portion, bent in a direction that is parallel or substantially parallel to the rotational axis; and
    a protrusion portion, extended from the arm portion, inserted into the corresponding one of the through holes from the surface of the circuit board that faces the motor attachment plate, the protrusion portion having at least one overhang extension protruding from the corresponding one of the through holes; and
    the overhang extension of the protrusion is bent in a direction that is perpendicular or substantially perpendicular to the rotational axis.

2. The brushless motor of claim 1, wherein the protrusion portion includes a first protrusion bent in a specified direction that is perpendicular or substantially perpendicular to the rotational axis, and a second protrusion is bent in a direction opposite to the specified direction.

3. The brushless motor of claim 2, wherein the specified direction is perpendicular or substantially perpendicular to a plate surface of the arm portion.

4. The brushless motor of claim 2, wherein the specified direction is parallel or substantially parallel to a plate surface of the arm portion.

5. The brushless motor of claim 1, wherein, before being bent, the first protrusion and the second protrusion are coplanar with a plate surface of the arm portion.

6. The brushless motor of claim 5, wherein, before being bent, the first protrusion and the second protrusion are substantially parallel to an extension direction of the corresponding one of the through holes.

7. The brushless motor of claim 1, wherein the protrusion has a hook shape.

8. The brushless motor of claim 1, wherein each of the through holes is arranged radially outwardly of the rotor.

9. The brushless motor of claim 1, wherein the circuit board has a coil pattern arranged to detect a rotational speed of the rotor, and each of the through holes is arranged radially outwardly of the coil pattern.

10. The brushless motor of claim 1, wherein the motor attachment plate has apertures respectively formed to penetrate the motor attachment plate in boundary regions between the fixing portions and the base portion, and an inner circumferential surface of each of the apertures includes a first surface exposed toward a space opposite to a space where the circuit board is mounted.

11. The brushless motor of claim 10, wherein the first surface extends substantially parallel to the circuit board.

12. The brushless motor of claim 10, wherein the protrusion portion is bent by supporting the first surface on a jig.

* * * * *